C. C. REDMOND & H. H. RHODES.
Gate.
No. 167,567.
Patented Sept. 7, 1875.
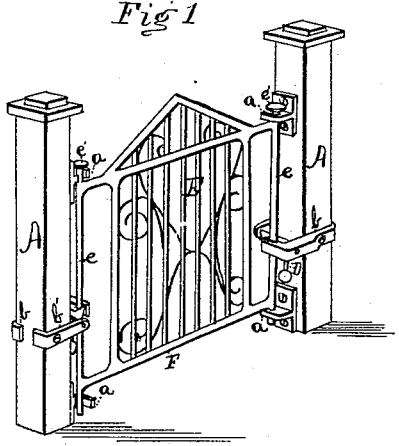
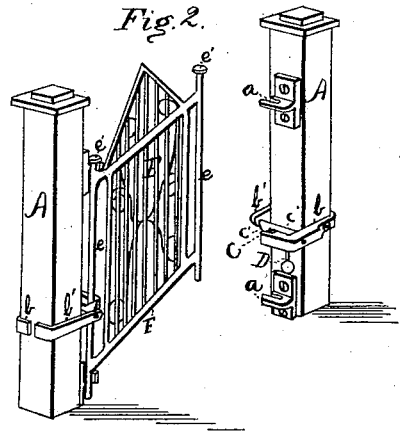
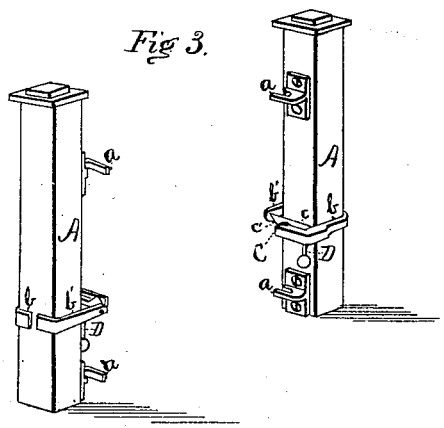
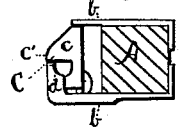
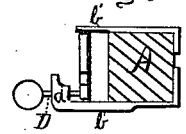
Witnesses
F. B. Townsend
Will H. Moxon
Inventor,
Charles C. Redmond
Henry H. Rhodes
per Attys
A. H. Evans & Co

UNITED STATES PATENT OFFICE.

CHARLES C. REDMOND AND HENRY H. RHODES, OF SAN JOSÉ, CALIFORNIA, ASSIGNORS OF ONE-HALF THEIR RIGHT TO ALEXANDER H. EVANS, OF WASHINGTON, DISTRICT OF COLUMBIA.

IMPROVEMENT IN GATES.

Specification forming part of Letters Patent No. 167,567, dated September 7, 1875; application filed August 7, 1875.

*To all whom it may concern:*

Be it known that we, CHARLES C. REDMOND and HENRY H. RHODES, of San José, California, have invented certain new and useful Improvements in Gates and Doors; and we hereby declare the following to be a clear, full, and exact description of the same, reference being had to the accompanying drawings, making a part of this specification, in which—

Figure 1 is a perspective view of our gate, closed. Fig. 2 is a similar view of the gate, partially open. Fig. 3 is a perspective view of the posts, with the gate or door removed. Fig. 4 is a plan view of the catch, in a closed position. Fig. 5 is the same, with the catch open.

Our invention relates to swinging gates or doors; and it consists in so constructing the gate or door that it may be opened from either side, but in opposite directions, while the entire gate or door swings horizontally on side hinges.

In order to enable others skilled in the art to make and use our invention, we will proceed to describe the exact manner in which we have carried it out.

In the drawings, A A represent posts or jambs, between which the gate or door is to be hung. On the upper or lower portions of each are secured the hooks $a$ $a$, turned in opposite directions on opposite posts or jambs, as shown in Fig. 3. At a suitable point between the hooks $a$ $a$ on each post is secured the catch C, formed as shown in Figs. 4 and 5. The latch $c$ is pivoted between the arms $b$ $b'$, and is provided with lips $c'$. This lip is held horizontal by the weighted lever D, as shown in Fig. 4. The lever being raised, throws the lip in a vertical position and opens the latch, as shown in Fig. 5. The arm $b$ is bent and recessed at $d$, immediately opposite a similar recess in the latch $c$. (See Fig. 4.) The gate E is constructed with outside bars $e$, which fit snugly in the hooks $a$ $a$ and in the recesses in the latch $c$. The lower horizontal bar F furnishes a rest for the gate or door on the lower hooks $a$ $a$, while the upper ends of the vertical bars $e$ are provided with the heads $e'$ $e'$, which rest upon the upper hooks $a$ $a$.

The operation of our gate is as follows: Suppose the gate to be closed, as shown in Fig. 1. A person approaching it from the opposite side would raise the weighted lever D, thus opening the latch $c$ and allowing the gate to swing open, as shown in Fig. 2, the hooks $a$ $a$ and latch $c$ acting as hinges on the opposite post. If the person had approached on the near side of the gate he would have raised the right-hand or opposite lever, and the gate would have swung open in the opposite direction on a horizontal plane.

It is evident from this description that doors of theaters, churches, and public halls could never become jammed in moments of excitement or danger by the pressure of a crowd, while, at the same time, doors thus constructed may, in ordinary use, be opened inwardly, which is desirable.

In the case of a farm-gate, which is used for driving through, our construction allows the gate to be swung from the direction of the horse on whichever side the vehicle may approach.

Having thus described our invention, what we claim as new, and desire to secure by Letters Patent, is—

1. A gate or door, constructed as shown, in which the entire gate swinging horizontally on side hinges can be opened on either side, but in opposite directions, substantially as and for the purpose set forth.

2. The gate or door E, in combination with the hooks $a$ $a$ and catches C, substantially as and for the purpose set forth.

CHARLES C. REDMOND.
H. H. RHODES.

Witnesses:
EDWARD HALSEY,
T. B. SMITH.